United States Patent
Mooney et al.

(10) Patent No.: US 7,840,214 B2
(45) Date of Patent: Nov. 23, 2010

(54) METHOD OF PROVIDING ACCESS INFORMATION TO AN ACCESS TERMINAL

(75) Inventors: Christopher Francis Mooney, Livingston, NJ (US); David Albert Rossetti, Randolph, NJ (US); Jialin Zou, Randolph, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 526 days.

(21) Appl. No.: 11/409,490

(22) Filed: Apr. 21, 2006

(65) Prior Publication Data

US 2007/0248060 A1 Oct. 25, 2007

(51) Int. Cl.
*H04W 4/00* (2009.01)
(52) U.S. Cl. ............... 455/434; 455/435.3; 455/450; 455/452.1
(58) Field of Classification Search ............ 455/434, 455/450, 452.1, 435.3
See application file for complete search history.

(56) References Cited

U.S. PATENT DOCUMENTS 7,065,586 B2 * 6/2006 Ruttenberg et al. ......... 709/244

2005/0228892 A1 * 10/2005 Riley et al. ................. 709/228

FOREIGN PATENT DOCUMENTS

WO WO 2004 014598 12/2004

OTHER PUBLICATIONS

International PCT Search Report PCT/US2007/009312 and Written Opinion mailed Nov. 5, 2007.
Hafid A., "A Scalable Video-On-Demand System Using Future Reservation of Resources and Multicast Communications" *Computer Communications*, Elsevier Science Publishers BV, Amsterdam, N., Vo. 21, No. 5, May 1998, pp. 431-444, XP004123937.
Hafid et al., "A Quality of Service Negotiation Approach With Future Reservations (Nafur): A Detailed Study" *Computer Networks and ISDN Systems*, North Holland Publishing, Amsterdam, NL., vol. 30, No. 8, May 1, 1998, pp. 777-794, XP00412281 1.
International PCT Search Report PCT/US2007/009312 and Written Opinion mailed Nov. 5, 2007.

* cited by examiner

*Primary Examiner*—Temica M Beamer
(74) *Attorney, Agent, or Firm*—Williams, Morgan & Amerson

(57) ABSTRACT

The present invention provides methods involving at least one access terminal and at least one access network. The methods may include providing or receiving information indicative of future accessibility of at least one access network.

20 Claims, 3 Drawing Sheets

METHOD OF PROVIDING ACCESS INFORMATION TO AN ACCESS TERMINAL

BACKGROUND OF THE INVENTION

1. Field of the Invention

This invention relates generally to communication systems, and, more particularly, to wireless communication systems.

2. Description of the Related Art

A conventional wireless communication system provides wireless connectivity to numerous access terminals such as the cellular telephones, personal data assistants, smart phones, pagers, text messaging devices, global positioning devices, notebook computers, desktop computers, and the like. For example, access networks in the wireless communication system may provide wireless connectivity to access terminals located in geographical areas, or cells, associated with the access networks. To initiate a call session, an idle access terminal transmits a call request (or connection request) to one or more access networks to provide wireless connectivity to the cell that includes the access terminal. If the access network has sufficient capacity to support a new call, then the access network may transmit a message granting the access terminal's call request. The requested call session may be initiated and the access terminal may enter the active state. However, not all call requests are granted.

A call request from an access terminal may be denied because the system is overloaded and lacks sufficient capacity to support a new call. For example, the access network may not have sufficient radio frequency resources to support an air interface between the access network and the access terminal and may therefore deny the request. In other situations, there may not be sufficient backhaul capacity to support adding an additional call in the wireless communication system. In yet other situations, the processor occupancy associated with processors in the base station or access network may be too high to support an additional call. When the call request from an access terminal is denied, the access network transmits a message to the access terminal indicating that the call request has been denied. However, the access network does not provide any indication of the future accessibility of the wireless communication system.

Access terminals typically respond to a call request denial using an apersistence procedure in which the access terminal waits for a random period of time before starting the access procedure again. However, the likelihood that the new call request will be denied may remain high when the access channels, and/or other parts of the wireless communication system, are heavily loaded or overloaded at least in part because the re-access procedure is a random activity. Continuing to attempt to re-access a heavily loaded or overloaded access network may exacerbate the overloading by consuming radiofrequency and/or processor resources associated with the access channels.

Access terminals may use data over signaling (DoS) techniques to transmit data using signaling channels such as the access channel. For example, access terminals may use DoS to initiate a push-to-talk (PTT) call. The DoS techniques typically bypass the admission control algorithms used to allocate traffic channels and therefore may result in a call request being admitted when traffic channels or other radiofrequency resources are not available to support the call. Consequently, attempting to access a heavily loaded or overloaded access terminal using DoS techniques may lead to undesirable end results such as false grants, phantom calls, and the like. Since the access terminal is typically unaware of the current and/or future accessibility of the wireless communication system, the system may continue to attempt to access the wireless communication system using DoS techniques, which may exacerbate the aforementioned problems.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In embodiments of the present invention, methods involving at least one access terminal and at least one access network are provided. The methods may include providing or receiving information indicative of future accessibility of at least one access network.

BRIEF DESCRIPTION OF THE DRAWINGS

The invention may be understood by reference to the following description taken in conjunction with the accompanying drawings, in which like reference numerals identify like elements, and in which.

Figure 1:
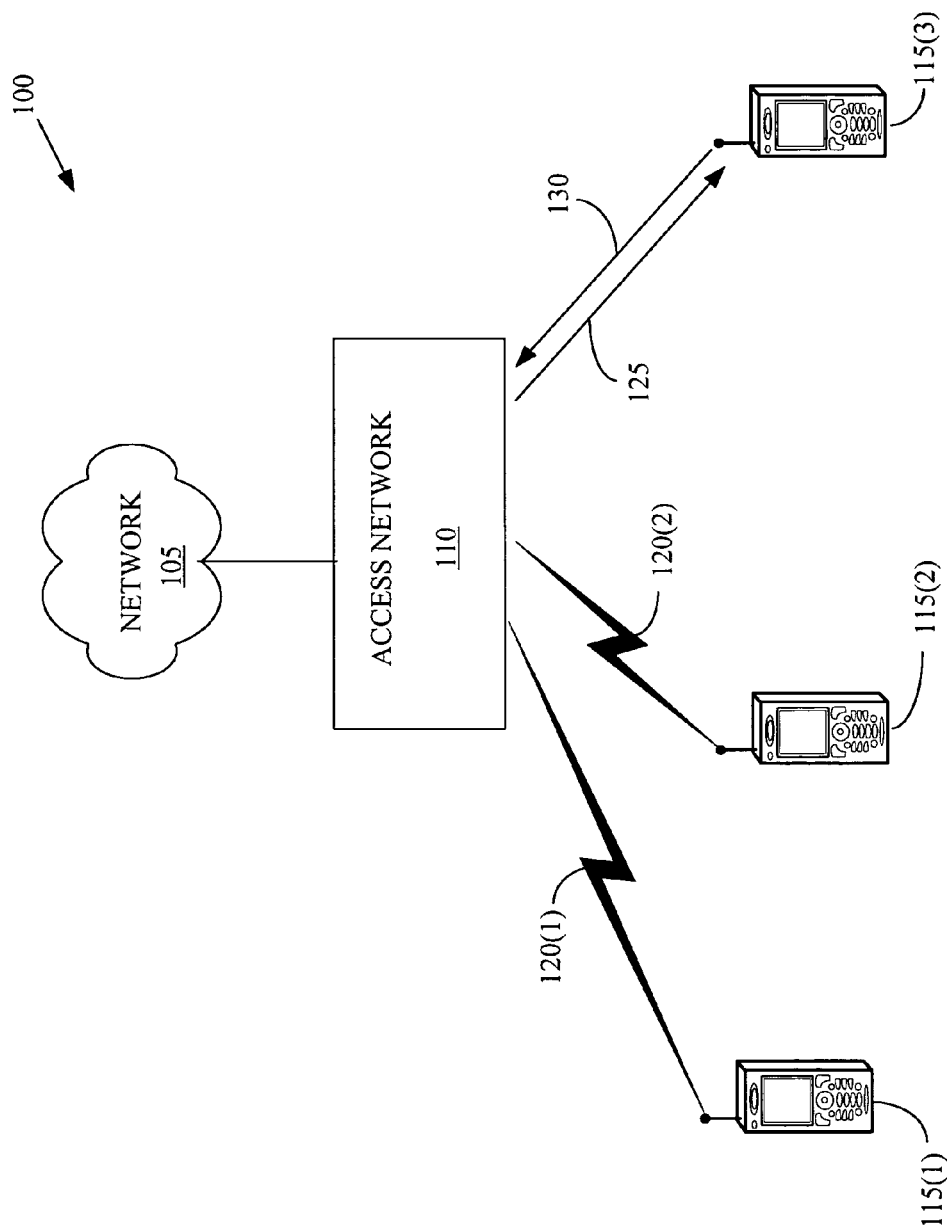
FIG. 1 conceptually illustrates a first exemplary embodiment of a wireless communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates a first exemplary embodiment of a wireless communication system 100. In the first exemplary embodiment, the wireless communication system 100 includes a network 105. The network 105 may operate according to one or more standards or protocols such as the Universal Mobile Telecommunication System (UMTS), the Global System for Mobile communications (GSM), Code Division Multiple Access (CDMA, CDMA 2000), and the like. Persons of ordinary skill in the art having benefit of the present disclosure should also appreciate that the network 105 may include wired portions that operate according to one or more wired protocols. However, the particular standards, protocols, or combinations thereof are matters of design choice and not material to the present invention.

One or more access networks 110 may be communicatively connected to the network 105 and used to provide wireless connectivity in the wireless communication system 100. Although a single access network 110 is shown in FIG. 1, persons of ordinary skill in the art having benefit of the present disclosure should appreciate that any number of access networks 110 may be deployed in the wireless communication system 100. Persons of ordinary skill in the art should also appreciate that the present invention is not limited to wireless communication systems that include access networks 110. In alternative embodiments, the wireless communication system 100 may include other devices (such as radio network controllers) for providing wireless connectivity. Techniques for configuring and/or operating the access networks 110 are known in the art and in the interest of clarity only those aspects of configuring and/or operating the access network 110 that are relevant to the present invention will be discussed further herein.

One or more access terminals 115(1-3) are deployed within the wireless communication system 100. The indices (1-3) may be used to indicate individual access terminals 115(1-3) or subsets thereof. However, these indices may be dropped when referring to the access terminals 115 collectively. This invention may also be applied to other elements shown in the figures and indicated by a numeral and one or more indices. Three access terminals 115 are shown in FIG. 1, but persons of ordinary skill in the art having benefit of the present disclosure should appreciate that any number of access terminals 115 may be deployed in the wireless communication system 100. Persons of ordinary skill in the art should also appreciate that the access terminals 115 may also be referred to using terms such as "mobile unit," "mobile station," "user equipment," "subscriber station," "subscriber terminal," and the like. Exemplary access terminals 115 include, but are not limited to, cellular telephones, personal data assistants, smart phones, pagers, text messaging devices, global positioning devices, network interface cards, notebook computers, and desktop computers. Techniques for configuring and/or operating the access terminals 115 are known in the art and in the interest of clarity only those aspects of configuring and/or operating the access terminals 115 that are relevant to the present invention will be discussed further herein.

In the illustrated embodiment, the access terminals 115(1-2) have established wireless connections to the access network 110 over air interfaces 120(1-2), respectively. The access terminals 115(1-2) are therefore referred to as being in the active state. The established wireless connections may be used to support one or more application flows over the air interfaces 120(1-2). For example, the access terminal 115(1) may have one application flow for a voice application such as Voice over Internet Protocol (VoIP) and one or more other application flows for high-speed uplink and/or downlink data flows. Application flows may be initiated when an idle access terminal 115 initiates a new communication session. Application flows may also be initiated and/or discontinued by an active access terminal 115 during an existing communication session. For example, an active access terminal 115 may provide a reservation on request (RoR) message to request resources to initiate a new application flow.

The wireless communication system 100 experiences a system load associated with the active access terminals 115 (1-2) and/or the air interfaces 120(1-2). As used herein, the term "system load" refers to resources of the wireless communication system that are reserved, allocated, or currently being used to support wireless communication with the access terminals 115(1-2) over the air interfaces 120(1-2). The system load may include resources associated with different entities in the wireless communication system. For example, a system load may include backhaul resources used to carry information between the network 105 and the access network 110. The system load may also include radiofrequency resources used to support the air interfaces 120(1-2), a processor occupancy associated with processors in the access network 110, and the like. Persons of ordinary skill in the art should appreciate that the system load may also include other components associated with the entity shown in FIG. 1, as well as other entities that are not shown in FIG. 1.

Loading of the wireless communication system 100, or individual entities within the wireless communication system 100, may determine whether or not the access network 110 admits new communication sessions and/or new application flows associated with existing sessions. If the access network 110 is overloaded, i.e., one or more of the resources needed to support wireless communication with the access network 110 is fully (or nearly fully) committed to supporting current communication sessions, the access network 110 may be unlikely to admit any new communication sessions or application flows. For example, if the backhaul link between the network 105 and the access network 110 is operating near or at full capacity, then the access network 110 may not be likely to admit new communication sessions or application flows. For another example, if most or all of the transmission power available to the access network 110 has been allocated to support the air interfaces 120(1-2), then the access network 110 may not be likely to admit new communication sessions or application flows.

The access network 110 may provide information indicating whether or not the access network 110 is likely to be accessible to one or more of the access terminals 115 in the future. In one embodiment, which will be discussed in more detail below, the information indicating future accessibility of the access network 110 includes a message 125 that indicates a scheduled re-access period or time slot for an idle access terminal 115(3),e.g., an access terminal 115(3) that does not have an existing connection, which has previously requested (as indicated by the arrow 130) a call connection (or an application flow) but been denied. The information indicating future accessibility of the access network 110 may also include a message indicating that the wireless communication system 100 is busy. In one embodiment, the information may be provided based upon a grade of service associated with one or more of the access terminals 115. The access terminals 115 may then utilize this information to determine when (or if) to attempt to access the wireless communication system 100 via the access network 110.

In some cases, the access network 110 may determine that resources have become available that permit a previously denied call connection (or application flow) request to be granted. For example, other connections may be released, which may free up previously allocated resources such as traffic channels for new calls. Accordingly, in one embodiment, the access network 110 may grant access to a previously denied call request from an access terminal 115 in response to determining that additional resources, such as one or more traffic channels, have become available. However, persons of ordinary skill in the art having benefit of the present disclosure should appreciate that changes in the allocation of any of the resources of the wireless communication system 100 may permit the access network 110 to admit previously denied call connection requests.

Figure 2:
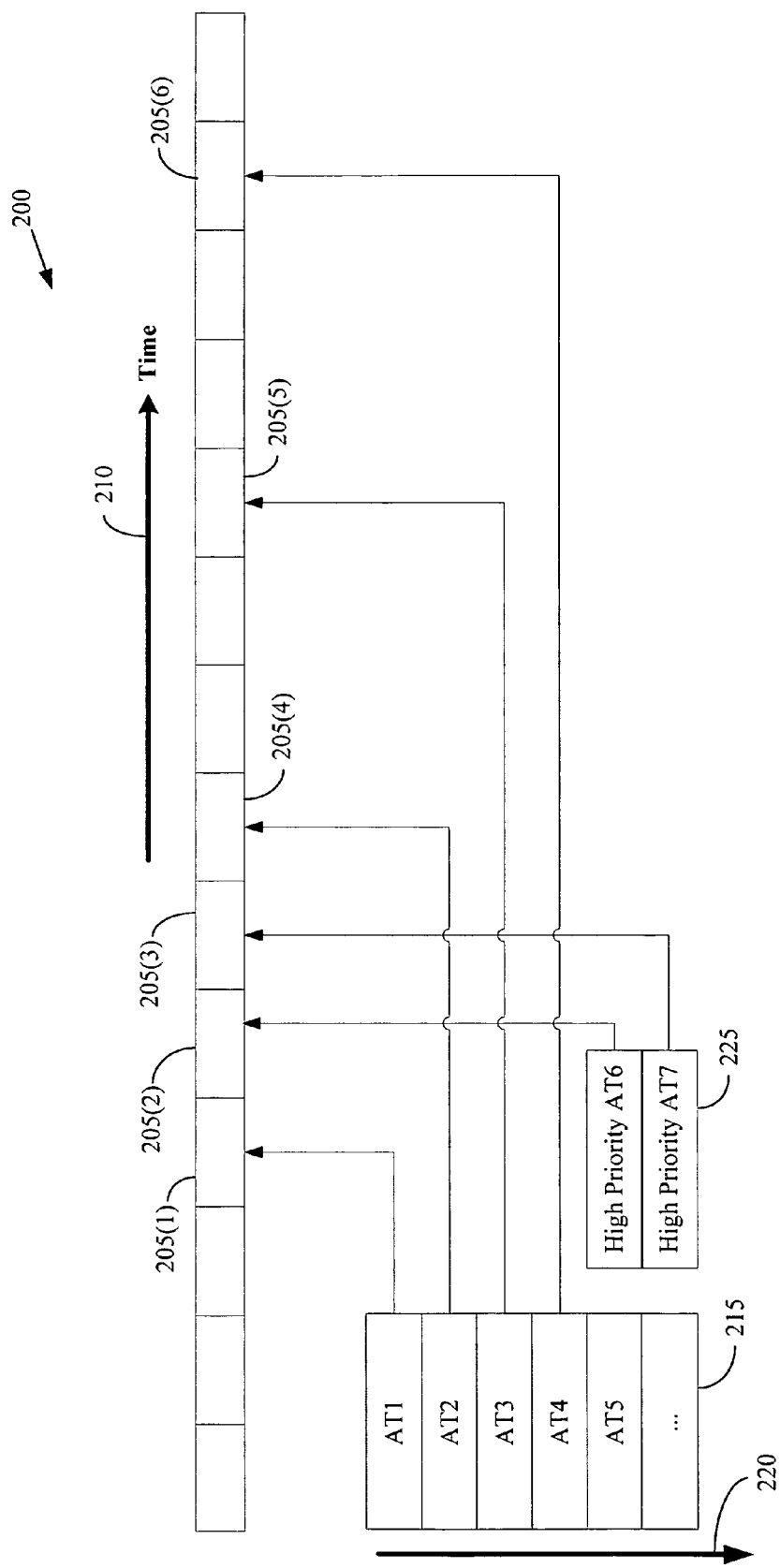
FIG. 2 conceptually illustrates one embodiment of a method for scheduling re-access attempts to a wireless communication system, in accordance with the present invention.

FIG. 2 conceptually illustrates one embodiment of a method 200 for scheduling re-access attempts to a wireless communication system. In the illustrated embodiment, the method 200 is implemented in an access network. However, the present invention is not limited to implementing the method 200 in the access network. In alternative embodiments, portions of the method 200 may be implemented in other wireless communication system entities besides the access network. Persons ordinary skill in the art having benefit of the present disclosure should appreciate that the method 200 may be implemented using hardware, firmware, software, or any combination thereof.

A plurality of time slots or time intervals 205 that may be used for the access attempts are shown with time increasing to the right, as indicated by the arrow 210. Not all of the time slots 205 have been indicated by numerals in FIG. 2. If an idle access terminal attempts to initiate a call connection, e.g., by sending a call connection request, and the access network denies the request, then the access network may log an identifier associated with the access terminal and the identifier may be placed in a queue 215. In one embodiment, the access terminal identifiers are placed in the queue 215 in the order in which the associated call connection requests are denied. For example, call connection requests associated with the idle access terminals AT1, AT2, AT3, AT4, and AT5 were denied in the order indicated by the arrow 220 and therefore have been placed in the queue 215 in the corresponding order.

The time slots 205 may be assigned to idle access terminals for a re-access attempt based upon the position of the access terminal in the queue 215. In the illustrated embodiment, the access terminal AT1 had a call connection request denied before any of the remaining access terminals and therefore is at the top of the queue 215. Accordingly, the access network may assign the access terminal AT1 to the timeslot 205(1) for a re-access attempt. Similarly the access terminals AT2, AT3, and AT4 may be assigned to the time slots 205 (4-6), respectively.

The access network may then provide information indicating the assigned timeslot 205 to the appropriate access terminal. In one embodiment, the assigned timeslot 205 is communicated to the appropriate access terminal in the same message that is used to notify the access terminal that the requested connection has been denied. For example, the access network may communicate the assigned timeslot 205 to the access terminal in a ConnectionDeny message. However, persons of ordinary skill in the art having benefit of the present disclosure should appreciate that the present invention is not limited to transmitting the assigned timeslot 205 to the access terminal in the same message that is used to deny a call connection request. In alternative embodiment, separate messages, which may be transmitted in any order, may be used to deny the call connection request and to convey the assigned timeslot 205.

The idle access terminals may then attempt to re-access a wireless communication system during the assigned timeslots 205. For example, the access terminals may transmit call connection requests during the assigned timeslot 205. The access terminals may be removed from the queue 215 after they successfully re-access the wireless communication system during the assigned timeslot 205. Alternatively, the access terminals may be removed from the queue 215 if the scheduled access time slot 205 expires before the access terminal is able to re-access the wireless communication system. Access terminals that are unable to re-access the wireless communication system during their scheduled timeslot 205 may be required to repeat the re-access procedure.

Alternatively, the idle access terminal may choose not to attempt to re-access the wireless communication system after it has received the scheduled re-access instruction with the delay specified. However, the access network may process the connection request in the queue 215 as soon as the system loading allowed. The access network may send a message indicating that the connection request was accepted to the access terminal that is waiting to re-access before the scheduled delay is expired.

In other embodiments, the persistence procedures described above may also be used to manage requests for new application flows by active terminals having an established communication session. For example, the persistence procedures may be applied to rejection of Reservation on Request (RoR) messages from active access terminals. When a Reservation of Request message is denied, the access network may determine a delay before the active access terminal is permitted to re-send the RoR message. In one embodiment, the scheduled delay could be included in the reservation rejection message. The RoR will be put into a queue at the access network, and the access terminal may issue another RoR after the scheduled delay. Alternatively, the access network may accept the RoR in the queue and send RoR accepted message to the access terminal before the scheduled delay is expired.

Priorities associated with the access terminals may be determined based upon the time at which the associated call connection request was denied. In the illustrated embodiment, the access terminal AT1 had a call connection request denied before any of the remaining access terminals and therefore has a relatively high priority for assignment to one of the time slots 205. Consequently, as discussed above, the access terminal AT1 may be placed at the top of the queue 215. However, other criteria may also be used to determine the priority of the access terminals. In the illustrated embodiment, the access terminals AT6, AT7 had a call connection request denied after the access terminals that are currently in the queue 215, but the access terminals AT6, AT7 may nevertheless be assigned a higher priority, e.g., for emergency calls or test calls. The access terminals AT6, AT7 may therefore be placed in a high priority queue 225.

The access terminals in the high priority queue 225 may be assigned time slots 205 for re-access attempts before some or all of the access terminals in the queue 215. In the illustrated embodiment, one or more time slots 205 may be left unassigned to allow high priority access terminals to receive relatively early timeslot assignments. For example, two timeslots 205(2-3) may be left between the time slots 205(1), 205(4) and the access network may assign the access terminals AT6, AT7 to the time slots 205(1), 205(4) based upon their relatively high priority. In one embodiment, the unassigned time slots 205 may also be used for random initial access attempts by new access terminals.

In one embodiment, the scheduled time slots 205 associated with neighboring sectors or cells may have an associated offset. For example, the time slots 205 associated with a first sector may be offset by a percentage of the duration of the timeslot 205 relative to the time slots associated with a second sector. Accordingly, access terminals that move from one sector to another while attempting to re-access the wireless communication system may be assigned a first timeslot 205 while in a first sector. The timeslot 205 assigned by the first sector may not correspond precisely to the timeslot structure in the second sector. In one embodiment, the access terminal may still attempt to re-access the wireless communication system during the assigned timeslot 205. Alternatively, the access terminal may be required to re-initiate the re-access procedure when it crosses into the new sector. Criteria for determining whether or not the access terminal may attempt to re-access the wireless communication system using the timeslot 205 assigned by the first sector when the access terminal enters the second sector are matters of design choice and not material to the present invention.

Figure 3:
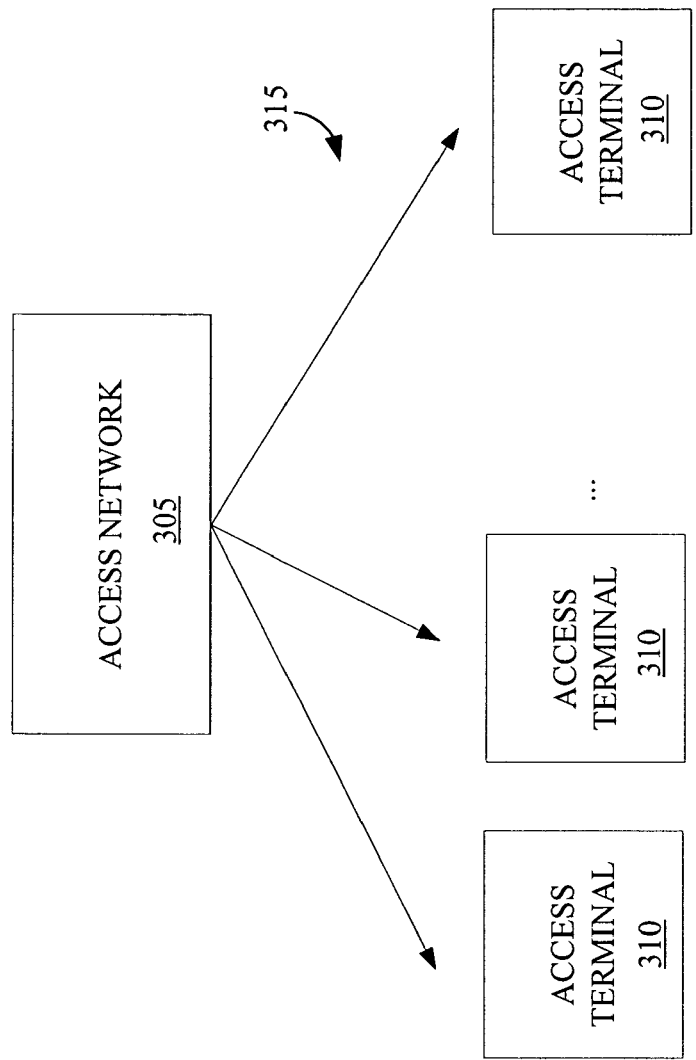
FIG. 3 conceptually illustrates a second exemplary embodiment of a wireless communication system that includes an access network and one or more access terminals, in accordance with the present invention.

FIG. 3 conceptually illustrates one exemplary embodiment of a wireless communication system 300 that includes an access network 305 and one or more access terminals 310. In the illustrated embodiment, a portion of the wireless communication system 300 is heavily loaded or overloaded. For example, the radiofrequency resources of the access network 305 may be fully (or nearly fully) allocated, the backhaul link may be operating near or at full capacity, the processor occupancy in the access network 305 may be high, or some other portion of the wireless communication system 300 may be heavily loaded or overloaded. At least in part because of the heavily loaded or overloaded condition of the wireless communication system 300, the access network 305 may be unlikely to grant future access requests by one or more of the access terminals 310.

The access network 305 may broadcast information indicating that the access network 305 is unlikely to grant future access requests, as indicated by the arrows 315. In one embodiment, the information may be sent as part of an overhead message, such as the QuickConfig message defined by Data Optimized standards. For example, one or more bits in the overhead message may be allocated as a system busy flag which may be set to indicate that future access requests are likely to be denied by the access network 305. Information indicating the reason for the likely denial of future access requests may also be provided. For example, a reason code indicating whether radiofrequency resources are fully (or nearly fully) allocated, the backhaul link is at or near full capacity, the processor occupancy is high, and the like may be transmitted. For another example, information indicating current levels of loading as instructions to various priority groups and service categories may also be provided.

The access terminals 310 may use the information provided by the access network 305 to determine whether or not to attempt to access the wireless communication system 300 via the access network 305. For example, access terminals 310 that are in the idle state may check the system busy flag in the overhead message before beginning the access procedure. Access terminals 310 that have a relatively low priority may not attempt to access the wireless communication system 300 if the system busy flag indicates that the access network 305 is likely to deny future access requests. In one embodiment, low priority access terminals 310 in the idle state may not initiate any access activity even if these activities are pre-scheduled or dictated by an apersistence rule. Low priority access terminals in the connected state (i.e., active access terminals) may also halt attempts to send Reservation on Request (RoR) messages if the system busy flag indicates that the access network 305 is likely to deny future access requests. Emergency calls and other high-priority calls may ignore the system busy indication, e.g. depending on the reason code or the current loading levels, if information indicating the recent code has been provided.

Referring back to FIG. 1, different grades of service may be associated with the access terminals 115. For example, in Data Optimized (DO) Rev-A/B, the Enhanced Access Channel (EMC) Media Access Control (MAC) protocols may be used to define new access class indices that may be assigned to the access terminals 115, e.g., a new negotiable, Generic Attribute Update Protocol (GAUP) attribute to EAC MAC called AllowedAccessTerminalClass could be added. Each bit in the AllowedAccessTerminalClass attribute would represent whether the access terminal 115 could be associated with one or more access classes. Exemplary values of the AllowedAccessTerminalClass attribute may range from 1 to 15, where 1 would mean Non-Emergency only, 2 would mean Emergency only, 4 would mean Test only, 8 would mean Low Latency only, and 15 would mean any access terminal 115. In one embodiment the default value of the AllowedAccessTerminalClass attribute would be 1. The specific methodology used by the access terminal 115 to choose its access class is a matter of design choice and not material to the present invention.

The grade of service associated with one or more of the access terminals 115 may be used to determine how the access terminal 115 responds to the information indicative of the future accessibility of the access network 305. In one embodiment, the information indicative of the future accessibility of the access network 305 may include indices indicating the grades of service that are permitted to attempt to access the access network 110. For example, emergency and/or test indices can be used to block or slow access attempts for non-emergency or non-test access terminals 115, thus reserving access capacity for the emergency/test access terminals 115. Thus, the persistence techniques described above can be used to reduce chance of access congestion during initial access.

The grade of service indicators may also be used to determine how access terminals 115 that have different quality of service requirements respond to information indicative of the future accessibility of the access network 110. In one embodiment, the access network 110 and the access terminals 115 may support latency-sensitive applications and/or latency-insensitive applications. Exemplary latency sensitive applications include Voice over Internet Protocol (VoIP), Video Telephony (VT), or push-to-talk (PTT), and the like. The grade of service indicators may therefore be used to indicate the parameters for a specific persistence configuration, e.g., in one or more persistence vectors, which should be applied to the access terminals 115. For example, latency-insensitive access terminals 115 (e.g. access terminals 115 that have no Quality of Service QoS applications running) may be associated with one persistence vector and latency-sensitive access terminals 115 (e.g., access terminals running VoIP or PTT) may be associated with another persistence vector. Accordingly, congestion control may be applied to latency tolerant access terminals 115 without affecting system level performance of latency intolerant applications running on other access terminals 115.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:

denying, at an access network, an access request for a new wireless connection over an air interface from at least one idle access terminal to the access network when insufficient resources are available to support the new wireless connection;

selecting, in response to denying the access request, a future time for said at least one idle access terminal to transmit a re-access request using information indicative of future accessibility of the access network to said at least one idle access terminal over the wireless connection;

transmitting, from the access network, information denying the access request and indicating the selected future time for said at least one idle access terminal to transmit the re-access request for the wireless connection; and queuing the access request at the access network until the selected future time.

2. The method of claim 1, further comprising providing the information to said at least one idle access terminal in a Connection Deny message.

3. The method of claim 2, wherein selecting the future time using the information indicative of future accessibility of said at least one access network comprises:

determining at least one re-access time slot during which said at least one idle access terminal is scheduled to transmit the re-access request over the air interface;

providing information indicative of said at least one re-access time slot to said at least one idle access terminal; and queuing the access request until said at least one re-access time slot has passed.

4. The method of claim 1, further comprising granting access to said at least one idle access terminal prior to said at least one re-access time slot when sufficient resources become available to support the new wireless connection while the access request is queued by the access network.

5. The method of claim 3, wherein selecting said at least one re-access time slot comprises selecting said at least one re-access time slot based on at least one priority associated with said at least one idle access terminal.

6. The method of claim 3, wherein queuing the access terminal comprises queuing said at least one idle access terminal in a queue containing a plurality of other idle access terminals in the order in which access requests by the idle access terminals were denied, and wherein selecting said at least one re-access time slot comprises selecting said at least one re-access time slot based on a position of said at least one idle access terminal in the queue.

7. The method of claim 3, wherein selecting said at least one re-access time slot comprises selecting said at least one re-access time slot based on at least one time offset associated with at least one sector including said at least one idle access terminal.

8. The method of claim 1, comprising determining information indicative of the future accessibility of the access network over the air interface, wherein determining the information indicative of future accessibility comprises determining information indicating that the system is busy.

9. The method of claim 8, wherein determining the information indicative of future accessibility of the access network comprises determining the information indicative of future accessibility based on at least one service grade associated with said at least one idle access terminal.

10. The method of claim 9, wherein determining the information indicative of future accessibility based on said at least one service grade comprises determining the information indicative of future accessibility based on at least one of an emergency status of the idle access terminal, a test status of the idle access terminal, and a latency status of the idle access terminal.

11. A method, comprising:
receiving, at an idle access terminal over an air interface, information denying an access request for a new wireless connection to an access network; and
receiving, at the idle access terminal, information indicating a future time for the idle access terminal to transmit a re-access request for the new wireless connection, the future time being selected using information indicating future accessibility of the access network, and wherein the access request is queued by the access network until the future time.

12. The method of claim 11, wherein receiving the information indicating the future time comprises receiving information indicative of at least one re-access time slot of the air interface.

13. The method of claim 12, further comprising receiving at least one message granting access to said at least one access request prior to said at least one re-access time when sufficient resources become available to support the new wireless connection while the access request remains queued by the access network.

14. The method of claim 12, wherein receiving the information indicative of said at least one re-access time slot comprises receiving information indicative of at least one re-access time slot determined based on at least one priority assigned to the idle access terminal.

15. The method of claim 12, wherein receiving the information indicative of said at least one re-access time slot comprises receiving information indicative of at least one re-access time slot determined based on a queue at the access network including the idle access terminal.

16. The method of claim 12, wherein receiving the information indicative of said at least one re-access time slot comprises receiving information indicative of at least one re-access time slot determined based on a time offset associated with at least one neighbor sector.

17. The method of claim 11, wherein receiving the information indicative of the re-access time slot comprises receiving information indicating that the system is overloaded.

18. The method of claim 11, wherein receiving the information indicative of the re-access time slot comprises receiving the information indicative of a re-access time slot selected based on at least one service grade associated with the idle access terminal.

19. The method of claim 18, wherein receiving the information indicative of a re-access time slot selected based on said at least one service grade comprises receiving the information indicative of a re-access time slot selected based on at least one of an emergency status of the idle access terminal, a test status of the idle access terminal, and a latency status of the idle access terminal.

20. The method of claim 11, comprising transmitting the re-access request for the new wireless connection at the future time.

* * * * *